(12) United States Patent
Osaka

(10) Patent No.: US 11,381,749 B2
(45) Date of Patent: Jul. 5, 2022

(54) CAMERA MODULE AND CAMERA-EQUIPPED DEVICE

(71) Applicant: Tomohiko Osaka, Tokyo (JP)

(72) Inventor: Tomohiko Osaka, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 17/270,071

(22) PCT Filed: Aug. 22, 2019

(86) PCT No.: PCT/JP2019/032766
§ 371 (c)(1),
(2) Date: Feb. 22, 2021

(87) PCT Pub. No.: WO2020/040242
PCT Pub. Date: Feb. 27, 2020

(65) Prior Publication Data
US 2021/0329170 A1    Oct. 21, 2021

(30) Foreign Application Priority Data

Aug. 22, 2018   (JP) .............................. JP2018-155351

(51) Int. Cl.
*H04N 5/232*     (2006.01)
*G02B 7/02*      (2021.01)
*H04N 5/225*     (2006.01)

(52) U.S. Cl.
CPC ........... *H04N 5/23287* (2013.01); *G02B 7/02* (2013.01); *H04N 5/2253* (2013.01); *H04N 5/2254* (2013.01); *H04N 5/23241* (2013.01)

(58) Field of Classification Search
CPC ........... H04N 5/23287; H04N 5/23241; H04N 5/2254; H04N 5/2253; H04N 5/225; H04N 5/232; H04N 5/3415; H04N 5/23212; H04N 9/093; H04N 9/04557; G02B 7/02;

(Continued)

(56) References Cited

U.S. PATENT DOCUMENTS

| | | | |
|---|---|---|---|
| 9,264,619 B2* | 2/2016 | Takizawa | H04N 5/23287 |
| 10,911,727 B2* | 2/2021 | MacKinnon | H01S 5/423 |
| 11,009,778 B2* | 5/2021 | Park | G03B 17/08 |

(Continued)

FOREIGN PATENT DOCUMENTS

| | | |
|---|---|---|
| JP | 2007-064063 | 3/2007 |
| JP | 2008-011327 | 1/2008 |

(Continued)

OTHER PUBLICATIONS

International Search Report and the Written Opinion dated Nov. 26, 2019 From the International Searching Authority Re. Application No. PCT/JP2019/032766 and Its Translation of Search Report Into English. (8 Pages).

*Primary Examiner* — Pritham D Prabhakher

(57) ABSTRACT

A camera module has: a lens holder for holding a lens unit; an image sensor holding unit that is arranged spaced apart from the lens holder in a first direction along the optical axis of the lens unit and holds an image sensor; and a drive unit that moves the image sensor holding unit with respect to the lens holder in a second direction and a third direction which are perpendicular to the optical axis and are perpendicular to each other, and that rotates the image sensor holding unit around the optical axis.

20 Claims, 7 Drawing Sheets

(58) Field of Classification Search
CPC ........ G02B 7/04; G02B 13/0055; G03B 5/00;
G03B 15/00; H01L 27/14625
USPC ...................................................... 348/208.7
See application file for complete search history.

(56) References Cited

U.S. PATENT DOCUMENTS

| | | | |
|---|---|---|---|
| 2005/0134699 A1 | 6/2005 | Nagashima et al. | |
| 2009/0147340 A1* | 6/2009 | Lipton | G03B 9/06 |
| | | | 359/230 |
| 2013/0016427 A1* | 1/2013 | Sugawara | G02B 7/08 |
| | | | 359/557 |
| 2014/0354836 A1* | 12/2014 | Takizawa | H04N 5/2254 |
| | | | 348/208.11 |
| 2015/0212336 A1* | 7/2015 | Hubert | G02B 27/646 |
| | | | 359/554 |
| 2016/0131923 A1* | 5/2016 | Hu | G02B 7/10 |
| | | | 359/557 |
| 2017/0289455 A1* | 10/2017 | Hu | H04N 5/2253 |
| 2017/0363881 A1* | 12/2017 | Stec | G02B 7/00 |
| 2018/0321503 A1* | 11/2018 | Brown | F03G 7/065 |
| 2018/0348538 A1* | 12/2018 | Sugawara | G03B 13/36 |
| 2018/0367767 A1* | 12/2018 | MacKinnon | H04N 5/23227 |
| 2019/0104242 A1* | 4/2019 | Wippermann | G02B 13/0015 |
| 2019/0265577 A1* | 8/2019 | Park | G03B 17/08 |
| 2019/0285967 A1* | 9/2019 | Himei | G03B 17/14 |
| 2020/0033699 A1* | 1/2020 | Kim | G02B 7/09 |
| 2021/0208417 A1 | 7/2021 | Choi et al. | |

FOREIGN PATENT DOCUMENTS

| | | |
|---|---|---|
| JP | 2008-067412 | 3/2008 |
| JP | 2012-177753 | 9/2012 |
| JP | 2013-210550 | 10/2013 |
| JP | 2019-152785 | 9/2015 |
| JP | 2015-191213 | 11/2015 |
| JP | 2016-042194 | 3/2016 |
| JP | 2017-173801 | 9/2017 |
| JP | 2021-524617 | 9/2021 |
| WO | WO 2017/156462 | 9/2017 |

\* cited by examiner

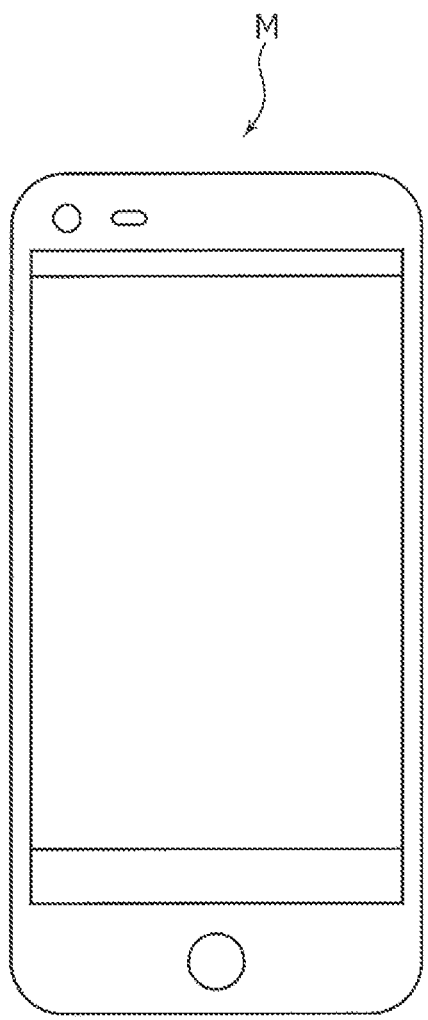
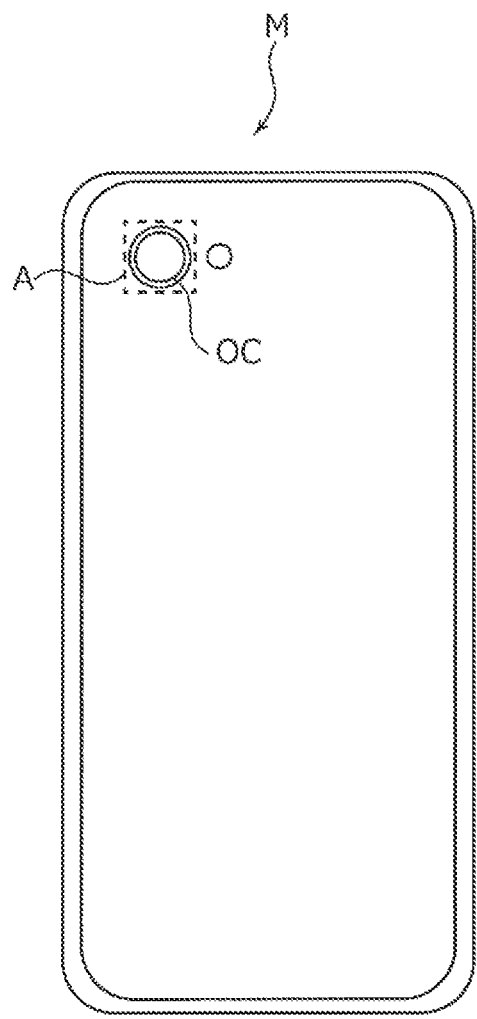
FIG. 1A
FIG. 1B

CAMERA MODULE AND CAMERA-EQUIPPED DEVICE

TECHNICAL FIELD

The present invention relates to a camera module and a camera-mounted device.

BACKGROUND ART

A small-sized camera module is commonly mounted in a mobile terminal such as a smartphone. Such a camera module includes, applied thereon, a lens driving device which has an autofocus (hereinafter, referred to as an "AF: auto focus") function to automatically perform focusing during imaging a subject, and a shake-correction (or an optical image stabilization, hereinafter referred to as an "OIS") function to optically correct shake (vibration) generated during the imaging to reduce distortion of an image (for example, PTL 1 and PTL 2). It has also been proposed to apply a lens driving device having a zoom function to a small-sized camera module mounted in a mobile terminal such as a smartphone. In performing the AF function or the zoom function, the lens driving device moves a lens part in the optical axis direction, and in performing the OIS function, the lens driving device moves the lens part in the directions orthogonal to the optical axis. Since a lens part of a camera module may be referred to as a "lens barrel," a lens drive method for moving the lens part in the directions orthogonal to the optical axis may be referred to as a "barrel shift method."

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

For small-sized camera modules applied to mobile terminals such as smartphones, it has been required to increase the effective aperture of a lens part to improve the F value for imaging in dark places such as when taking pictures at night.

However, increasing the effective aperture of a lens part increases the weight of the lens part, thereby disadvantageously increasing the power consumption at the time of driving a lens by the so-called barrel shift method.

Of the various types of shakes to a camera module, a shake that rotates the camera module in a direction around the optical axis of a lens part (hereinafter also referred to as "around axis direction") makes reduction of deterioration in image quality by driving a lens difficult, that is, it is difficult to correct the shake in the around axis direction with the barrel shift method.

An object of the present invention is to provide a camera module capable of improving the performance of optical image stabilization without significantly increasing the power consumption of a device, such as a mobile terminal, which is equipped with the camera module, and to provide a camera-mounted device including the camera module.

Solution to Problem

A camera module that reflects the first aspect of the present invention includes:
a lens holder that holds a lens part;
an image sensor holding part that holds the image sensor, the image sensor holding part being disposed apart from the lens holder in a first direction along an optical axis of the lens part; and
a driving part that moves the image sensor holding part in a second direction and a third direction with respect to the lens holder and rotates the image sensor holding part in an around axis direction about the optical axis with respect to the lens holder, the second direction and the third direction being orthogonal to the optical axis and orthogonal to each other.

A camera-mounted device that reflects the second aspect of the present invention is an information device or a transporting device, the camera-mounted device including:
the camera module described above; and
an image processing part that processes image information obtained by the image sensor.

Advantageous Effects of Invention

The present invention can improve the performance of optical image stabilization without significantly increasing the power consumption of a device, such as a mobile terminal, which is equipped with a camera module of the present invention.

BRIEF DESCRIPTION OF DRAWINGS

FIGS. 1A and 1B illustrate a smartphone equipped with a camera module according to an embodiment of the present invention, where FIG. 1A is a front view of the smartphone, and FIG. 1B is a rear view of the smartphone;

FIG. 3A is a plan view of the image sensor disposition part, and FIG. 3B is a cross-sectional view schematically showing a vertical cross section of the image sensor disposition part taken along the line III-III of FIG. 3A with a positional relationship of the image sensor disposition part to a magnet part;

FIG. 4A is a plan view of the image sensor disposition part, and FIG. 4B is a cross-sectional view schematically showing a vertical cross section of the image sensor disposition part taken along the line IV-IV of FIG. 4A with a positional relationship of the image sensor disposition part to a magnet part;

FIG. 6A is a front view of the automobile, and FIG. 6B is a rear perspective view of the automobile.

DESCRIPTION OF EMBODIMENTS

An embodiment of the present invention will be described in detail below with reference to the accompanying drawings.

FIGS. 1A and 1B illustrate smartphone M (camera-mounted device), which is an example of an information device equipped with camera module A according to an embodiment of the present invention. FIG. 1A is a front view of smartphone M, and FIG. 1B is a rear view of smartphone M.

Camera module A is mounted in smartphone M as, for example, rear camera OC. Camera module A includes an AF function and an OIS function to automatically achieve focusing when a subject is to be imaged and optically correct shake (vibration) occurred during the imaging, thereby capturing an image with no image blur. Camera module A may include a zoom function.

Figure 2A:
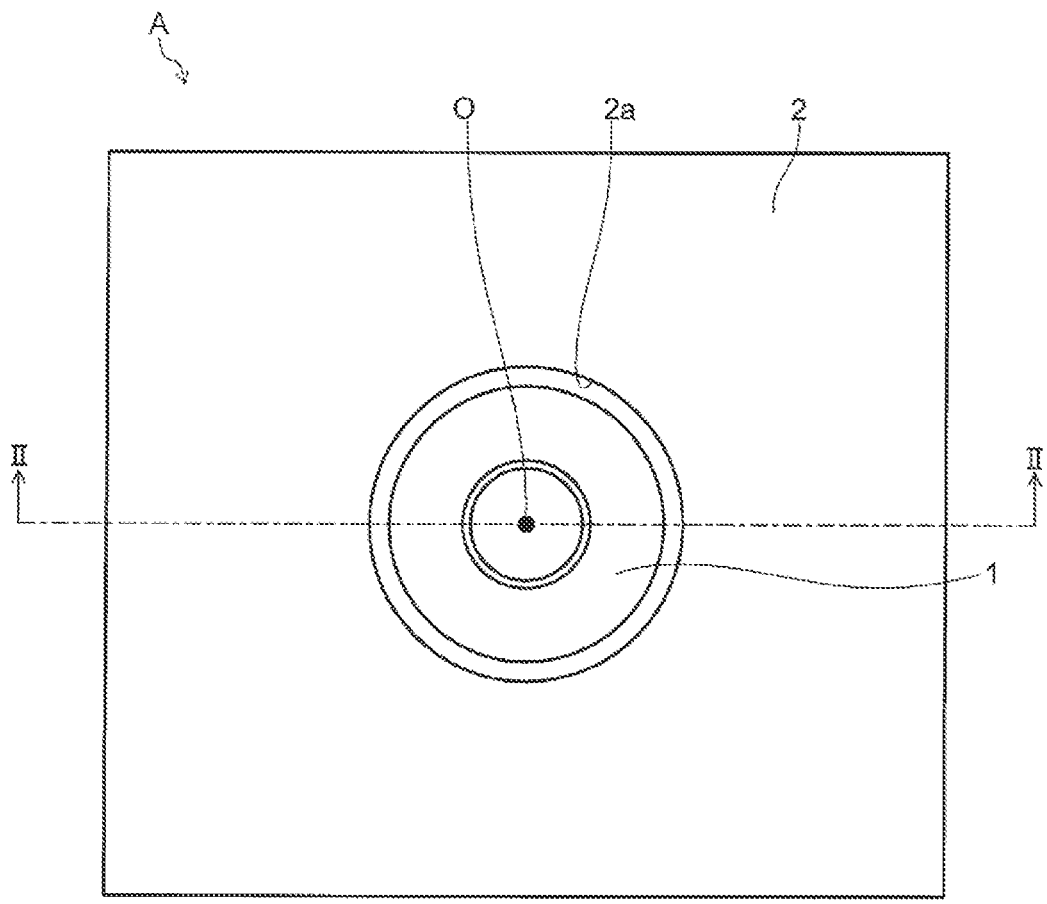
FIG. 2A is a plan view of the camera module.
Figure 2B:
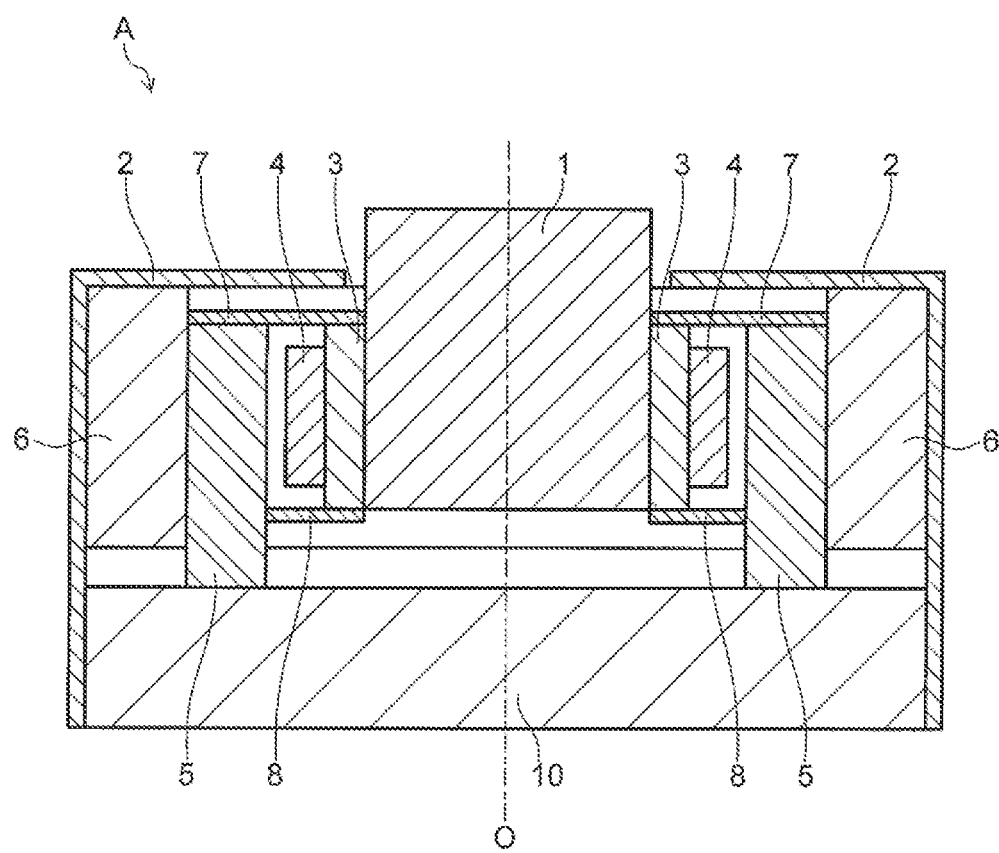
FIG. 2B is a cross-sectional view schematically showing a vertical cross section of the camera module taken along the line II-II of FIG. 2A.
Figure 2B:
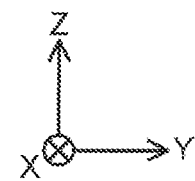

FIGS. 2A and 2B schematically illustrates the overall structure of camera module A, where FIG. 2A is a plan view of camera module A, and FIG. 2B is a cross-sectional view schematically showing a vertical cross section of camera module A. As shown in FIGS. 2A to 6B, description will be given in the present embodiment with an orthogonal coordinate system (X, Y, Z). Camera module A is mounted in smartphone M in such a way that the X direction is a vertical direction (or a horizontal direction), the Y direction is a horizontal direction (or a vertical direction), and the Z direction is a front-rear direction when the imaging is actually performed with the use of smartphone M. That is, the Z direction is along optical axis O (i.e., the optical axis direction). More specifically, the front side of the drawing in FIG. 2A and the upper side in FIG. 2B are the light receiving side in the optical axis direction (also referred to as "macro position side"), and the back side of the drawing in FIG. 2A and the lower side in FIG. 2B are the imaging side in the optical axis direction (also referred to as "infinite position side"). The X direction and the Y direction each orthogonal to the Z direction (optical axis) are referred to as "directions orthogonal to the optical axis, or optical-axis orthogonal directions."

Camera module A includes lens part 1 which includes a cylindrical lens barrel housing a lens, and shield cover (hereinafter simply referred to as "cover") 2 which covers the entire camera module A. In the present embodiment, cover 2 is a covered square cylinder formed in a rectangular shape in plan view in the optical axis direction, and includes circular opening 2a on its top surface. A substantially rectangular parallelepiped space is formed inside cover 2. Lens part 1 housed in cover 2 is disposed so as to face the outside (the light receiving side in the optical axis direction) from opening 2a.

Lens part 1 is housed in lens holder 3 that includes a tubular inner peripheral surface (i.e., inner wall surface) as a lens housing part. For example, the inner wall surface is provided with a groove to which an adhesive is applied, and lens part 1 is screwed into the groove to fix lens part 1 to lens holder 3, thereby allowing lens holder 3 to hold lens part 1.

Coil part for AF (hereinafter also referred to as "AF coil part") 4 is disposed on the outer peripheral surface of lens holder 3. For example, AF coil part 4 is provided on lens holder 3 by winding the AF coil part around the outer peripheral surface of the lens holder. AF coil part 4 is an air-core coil in which current flows during focusing, and is wound around the outer peripheral surface of lens holder 3. Both ends of AF coil part 4 are tied to tying parts (not illustrated) of lens holder 3. The current flowing in AF coil part 4 is controlled by not illustrated control integrated circuit (IC). The control IC is disposed, for example, on image sensor board 12 of image sensor disposition part 10.

Magnet part 5 made of, for example, a permanent magnet is disposed radially outside lens part 1 so as to face AF coil part 4. In the present embodiment, magnet part 5 is disposed along (or parallel to) the four sides of cover 2 in plan view, and is held by magnet holder 6 fixed to the inner wall surface of cover 2. Magnet part 5 held by magnet holder 6 is disposed so as to face not only AF coil part 4, but also coil parts for OIS (hereinafter also referred to as "OIS coil parts") disposed along (or parallel to) the four sides of cover 2 in plan view. OIS coil parts include OIS coil parts 16a in the X direction (hereinafter also referred to as "X-direction OIS coil parts"), OIS coil parts 16b in the Y direction (hereinafter also referred to as "Y-direction OIS coil parts"), and OIS coil parts 16c in the θ direction (hereinafter also referred to as "θ-direction OIS coil parts"), (see, for example, FIG. 3A). Magnet holder 6 includes in the central portion thereof in plan view an opening as a lens holder housing part through which optical axis O can pass. Lens holder 3 is housed in the space of the opening.

Lens holder 3 is elastically supported by elastic support members for AF (hereinafter also referred to as "AF elastic support members": upper leaf spring 7 and lower leaf spring 8) so as to be movable in the Z direction with respect to a fixed part including magnet holder 6, cover 2, and the like, while the lens holder is positioned so as not to be movable in the X or Y direction and not to be rotatable in the θ direction with respect to the fixed part including magnet holder 6, cover 2, and the like. AF elastic support members 7 and 8 are formed of a conductive metal material such as titanium copper, nickel copper, or stainless steel. The flexibility of AF elastic support members 7 and 8 may be such that the moving stroke of lens holder 3 in the Z direction can be obtained. Each of AF elastic support members 7 and 8 is connected to lens holder 3 at its inner peripheral end and connected to magnet holder 6 at its outer peripheral end. It is preferred that AF elastic support members 7 and 8 are electrically connected to AF coil part 4 so as to, for example, form a part of a power supply path to AF coil part 4.

Current is allowed to flow in AF coil part 4 for performing automatic focusing in camera module A. The current flowing in AF coil part 4 is controlled by not illustrated control IC. This control is performed based on a control signal supplied from the outside of camera module A and a detection result obtained by a lens position detecting element, such as a hall element (not illustrated), built in or connected to the control IC.

When current flows in AF coil part 4, Lorentz force is generated in AF coil part 4 due to the interaction between the magnetic field of magnet part 5 and the current flowing through AF coil part 4 (Fleming's left-hand rule). Lorentz force is in a direction (Z direction) orthogonal to the direction (X direction or Y direction) of the magnetic field and the direction (Y direction or X direction) of the current flowing through AF coil part 4. The direction of the magnetic field is preset so that Lorentz force is in a desired direction. Magnet part 5 is fixed, thus a reaction force acts on AF coil part 4. This reaction force serves as a driving force of a voice coil motor for AF, and lens holder 3 including AF coil part 4 and lens part 1 housed in lens holder 3 are moved in the optical axis direction, thereby performing the focusing.

When current does not flow so that focusing is not performed, lens holder 3 is in a state to be suspended by upper leaf spring 7 and lower leaf spring 8 at a neutral position (hereinafter referred to as "reference state") between the infinite position and the macro position. That is, lens holder 3 and lens part 1 housed in lens holder 3 are elastically supported by upper leaf spring 7 and lower leaf spring 8 so as to be displaceable to both sides in the Z direction while they are positioned at the neutral position with respect to the fixed part including magnet holder 6 and the like. Lens holder 3 that has moved to the infinite position side or the macro position side is urged to return to the neutral position by the elastic force of upper leaf spring 7 and lower leaf spring 8.

For performing the focusing, the direction of the current is controlled according to whether lens holder 3 is moved from the reference state to the macro position side or to the infinite position side. The magnitude of the current is controlled according to the moving distance of lens holder 3.

Image sensor disposition part 10 of camera module A is disposed so as to be spaced apart from lens holder 3 and magnet holder 6 toward the imaging side in the optical axis direction.

Figure 3A:
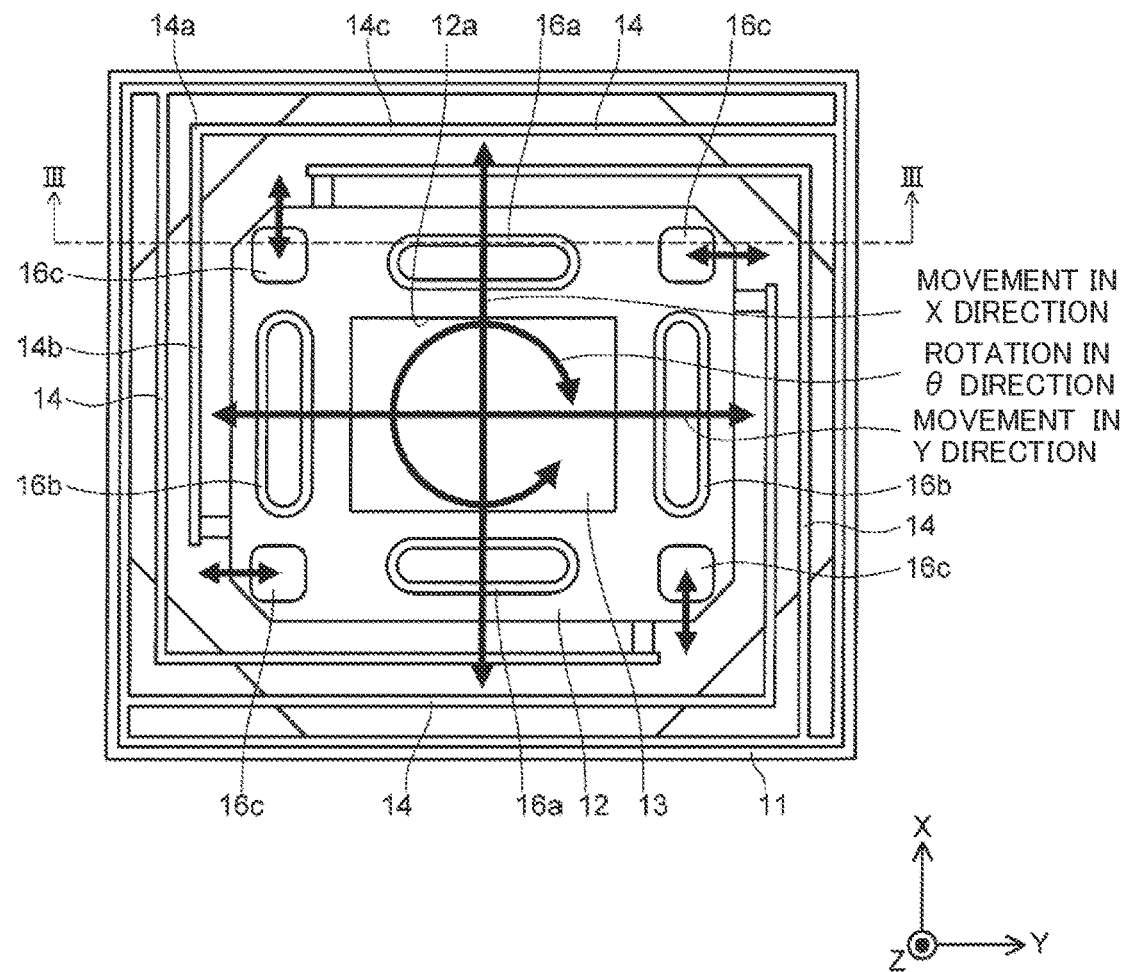
FIGS. 3A and 3B illustrate an image sensor disposition part of the camera module, where
Figure 3B:
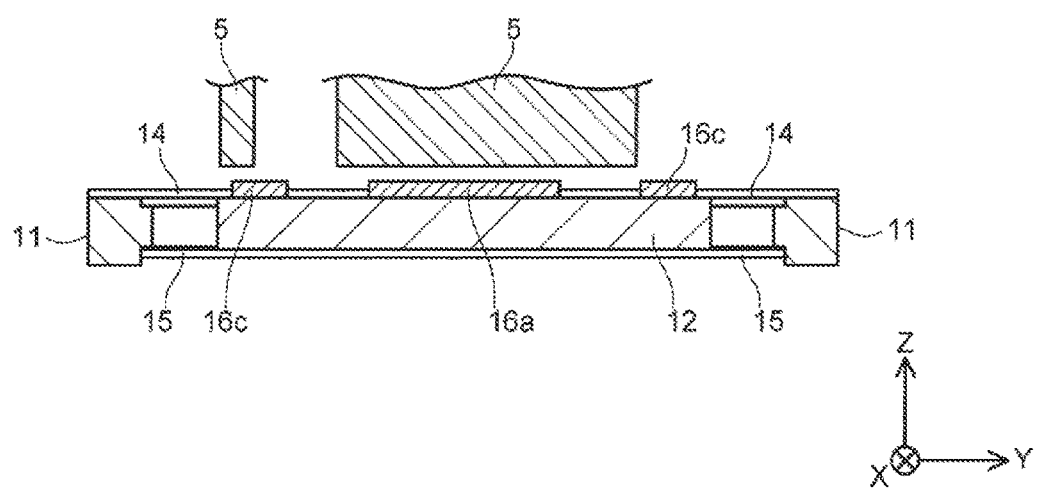

FIGS. 3A and 3B illustrate image sensor disposition part 10 of camera module A, where FIG. 3A is a plan view of image sensor disposition part 10, and FIG. 3B is a cross-sectional view schematically showing a vertical cross section of image sensor disposition part 10 with a positional relationship of the image sensor disposition part to magnet part 5.

Image sensor disposition part 10 includes base part 11, image sensor board 12, image sensor 13, elastic support members for OIS (hereinafter also referred to as "OIS elastic support members") 14 and 15, at least one OIS coil part in the X direction (hereinafter, simply referred to as "X coil part") 16a, at least one OIS coil part in the Y direction (hereinafter, simply referred to as "Y coil part") 16b, and at least one OIS coil part in the θ direction (hereinafter, simply referred to as "θ coil part") 16c.

Base part 11 is a rectangular frame in plan view, and is attached to the lower end of the inner wall surface of cover 2. In the present embodiment, base part 11 is a frame-shaped body with its both sides in the vertical direction open widely, but may be a bottomed body with one side closed.

Image sensor board 12 is disposed in the central portion of image sensor disposition part 10. Image sensor board 12 is an example of an image sensor holding part, and image sensor 13 is mounted in the central portion of the image sensor board. More specifically, opening 12a is provided in the central portion of image sensor board 12, and image sensor 13 is attached to the back surface of image sensor board 12 so as to close this opening 12a. Image sensor 13 includes, for example, a charge-coupled device (CCD) image sensor or a complementary metal oxide semiconductor (CMOS) image sensor. Image sensor 13 captures the subject image formed by lens part 1. The image information obtained by image sensor 13 is processed by an image processing part (for example, central processing unit: CPU) built in smartphone M.

Image sensor board 12 is elastically supported by OIS elastic support members 14 and 15 so as to be movable in the X and Y directions, and to be rotatable in the around axis direction (θ direction) about the optical axis, with respect to a fixed part including base part 11, cover 2, and the like. OIS elastic support members 14 and 15 are formed of a conductive metal material such as titanium copper, nickel copper, or stainless steel. The flexibility of OIS elastic support members 14 and 15 may be such that the moving stroke of image sensor board 12 in the X and Y directions, and the rotation stroke of image sensor board 12 in the θ direction can be obtained. Each of OIS elastic support members 14 and 15 is connected to image sensor board 12 at its inner peripheral end and connected to base part 11 at its outer peripheral end. It is preferred that OIS elastic support members 14 and 15 electrically connect the fixed part and image sensor board 12, thereby enabling power supply from the outside to image sensor 13 and signal transmission between the outside and image sensor 13. It is also preferred that OIS elastic support members 14 and 15 are electrically connected to the OIS coil part (X coil part 16a, Y coil part 16b, and θ coil part 16c) and control IC (not illustrated) so as to, for example, form a part of a power supply path to the OIS coil part.

OIS elastic support members 14 and 15 that bridge between the fixed part and image sensor board 12 have a shape such that the members are bent in the same circumferential direction in such a way that each member surrounds the periphery of image sensor board 12 between its both ends on the inner peripheral side and the outer peripheral side. More simply, OIS elastic support members 14 and 15 each has a spirally bent shape, in other words, a bent shape like a fylfot. Adopting such a shape enables obtainment of highly accurate driving in the θ direction in addition to the X and Y directions.

OIS elastic support members 14 and 15 respectively include at least one upper elastic arm 14 and at least one lower elastic arm 15. Upper elastic arms 14 are disposed relatively on the light receiving side in the Z direction as an upper part, more specifically on the front surface side of image sensor board 12, and lower elastic arms 15 are disposed relatively on the imaging side in the Z direction as a lower part, more specifically on the back surface side of image sensor board 12. Disposing the OIS support members separately in two stages, namely upper and lower stages, in this way enables elimination of an undesired inclination (tilt) of image sensor board 12 and thus of image sensor 13.

Further, upper elastic arms 14 each include X-direction extending part 14b extending linearly in the X direction and Y-direction extending part 14c extending linearly in the Y direction with bent part 14a as a boundary. X-direction extending part 14b and Y-direction extending part 14c respectively extend in the X-direction and the Y-direction from bent part 14a located in the vicinity of a corner of image sensor board 12 and base part 11, both of which have a rectangular shape in plan view, to partly surround image sensor board 12 in the length of two of the four sides thereof. Each lower elastic arm 15 has a similar configuration. Adopting such a shape for each of upper elastic arm 14 and lower elastic arm 15 allows to obtain a sufficient stroke in all the movable directions of image sensor board 12, namely in the X direction, the Y direction, and the θ direction.

On image sensor board 12, X coil parts 16a and Y coil parts 16b are disposed in the periphery of image sensor 13 along the four sides of image sensor board 12.

On image sensor board 12, θ coil parts 16c are disposed in the periphery of image sensor 13 at diagonal positions, each of which is located between X coil part 16a and Y coil part 16b, of image sensor board 12.

Current is allowed to flow in X coil part 16a, Y coil part 16b, and/or θ coil part 16c for performing optical image stabilization in camera module A. Specifically, the current flowing in X coil part 16a, Y coil part 16b, and/or θ coil part 16c is controlled based on the detection signal output from a shake detection part (not illustrated, for example, a gyro sensor) so that the shake of camera module A is offset. In this case, the detection results of a not illustrated position detector (for example, hall element) are fed back to enable accurate control of the swaying (movement in the X direction, movement in the Y direction, and rotation in the θ direction) of image sensor board 12. The total number of upper elastic arms 14 and lower elastic arms 15 is not particularly limited and can be appropriately changed for the implementation, but the number is preferably set appropriately according to the required number of power supply systems and signal lines.

When current flows in X coil part 16a, Y coil part 16b, and/or θ coil part 16c, Lorentz force is generated in X coil part 16a, Y coil part 16b, and/or θ coil part 16c due to the interaction between the magnetic field of magnet part 5 and the current flowing through X coil part 16a, Y coil part 16b, and/or θ coil part 16c (Fleming's left-hand rule). Lorentz force is in a direction (Y direction or X direction) orthogonal to the direction (Z direction) of the magnetic field at the long side of X coil part 16a, Y coil part 16b, and/or θ coil part 16c and the direction (X direction or Y direction) of the current flow. For performing optical image stabilization in the θ direction, for example, it is possible to generate a reaction force acting in the θ direction as a whole by generating Lorentz force in a pair of two θ coil parts 16c at diagonal positions in directions away from each other in the X direction, and generating Lorentz force in another pair of two θ coil parts 16c at different diagonal positions in directions away from each other in the Y direction. The direction of the magnetic field is preset so that Lorentz force is in a desired direction. Magnet part 5 is fixed, thus the reaction force acts on X coil part 16a, Y coil part 16b, and/or θ coil part 16c. This reaction force serves as a driving force of a voice coil motor for OIS, and image sensor board 12 including X coil part 16a, Y coil part 16b, and θ coil part 16c sways in the X direction, Y direction, or θ direction in the XY plane, thereby performing the optical image stabilization.

When current does not flow so that optical image stabilization is not performed, image sensor board 12 is in a state to be suspended by upper elastic arm 14 and lower elastic arm 15 at a neutral position (hereinafter referred to as "reference state") not moving in either the X direction or the Y direction or tilting in the θ direction. That is, image sensor board 12 and image sensor 13 mounted in image sensor board 12 are elastically supported by upper elastic arm 14 and lower elastic arm 15 so as to be displaceable to both sides in the X direction, both sides in the Y direction, and both sides in the θ direction while they are positioned at the neutral position with respect to the fixed part including base part 11 and the like. Image sensor board 12 which has moved in the X or Y direction or rotated in the θ direction is urged to return to the neutral position by the elastic force of upper elastic arm 14 and lower elastic arm 15.

When optical image stabilization is performed, a target coil part for power supply and the direction of the current to be supplied are controlled according to the direction in which image sensor board 12 is to be moved or rotated from the reference state. The magnitude of the current is controlled according to the moving distance and the rotation angle of image sensor board 12.

Upper elastic arm 14 and lower elastic arm 15 may each have elasticity in the Z direction. That is, upper elastic arm 14 and lower elastic arm 15 may elastically support image sensor board 12 with respect to the fixed part including base part 11 and the like so that image sensor board 12 is also movable in the Z direction. This configuration enables the stroke of a movable part for focusing to increase.

As described above, camera module A according to the present embodiment includes lens holder 3 holding lens part 1; image sensor board 12 which is disposed apart from lens holder 3 in the Z direction along optical axis θ of lens part 1 and holds image sensor 13; and a driving part including magnet part 5, X coil parts 16a, Y coil parts 16b, and θ coil parts 16c which, with respect to lens holder 3, move image sensor board 12 in the X and Y directions orthogonal to optical axis θ and orthogonal to each other, and rotate image sensor board 12 in the θ direction about optical axis O. In this configuration, the optical image stabilization is performed by a sensor shift method, not by a barrel shift method, so that the increase of the weight of lens part 1 does not cause the increase of the power consumption during the driving. In addition, the optical image stabilization in the θ direction, which cannot be achieved by the lens drive, can be achieved, thereby significantly improving the accuracy of the optical image stabilization.

In the present embodiment, magnet part 5 cooperates with all of the X coil part 16a, which moves image sensor board 12 in the X direction, Y coil part 16b, which moves image sensor board 12 in the Y direction, and θ coil part 16c, which moves image sensor board 12 in the θ direction, to generate a thrust (Lorentz force) for moving the movable part in a desired direction. In other words, magnet part 5 is used for both of rotating image sensor board 12 in the θ direction and moving image sensor board 12 in the X or Y direction. This configuration can reduce the number of components, thereby reducing the scale of the device.

Magnet part 5 may be used for moving image sensor board 12 or lens holder 3 in the Z direction in addition to rotating image sensor board 12 in the θ direction. Alternatively, magnet part 5 may be used for moving image sensor board 12 or lens holder 3 in the Z direction in addition to rotating image sensor board 12 in the θ direction and moving image sensor board 12 in the X or Y direction. This configuration can further reduce the number of components, thereby further reducing the scale of the device.

In the not illustrated first modification of the present embodiment, a magnet part for optical image stabilization in the θ direction may be disposed separately from magnet part 5. The disposed position of the magnet part for optical image stabilization in the θ direction may be at magnet holder 6 or at image sensor disposition part 10 (base part 11) in the first modification.

Figure 4A:
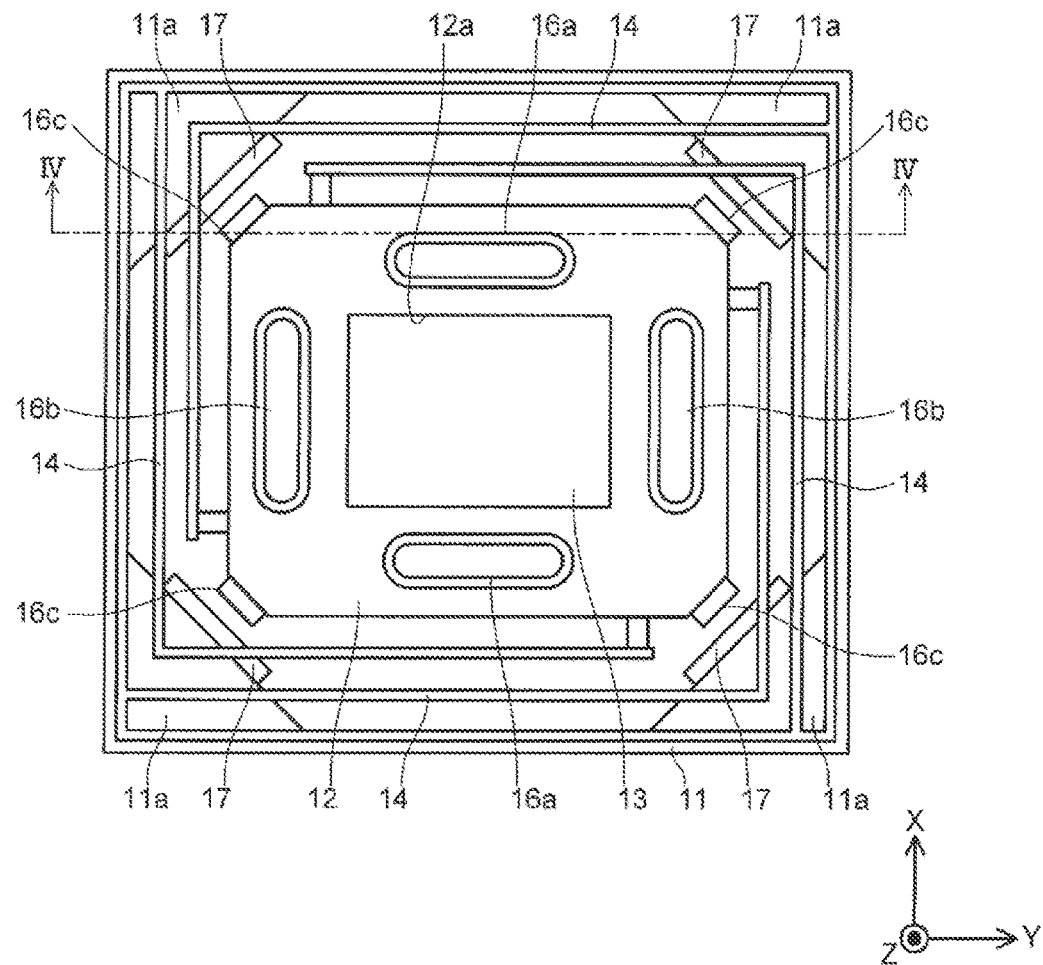
FIGS. 4A and 4B illustrate a second modification of the image sensor disposition part of the camera module, where
Figure 4B:
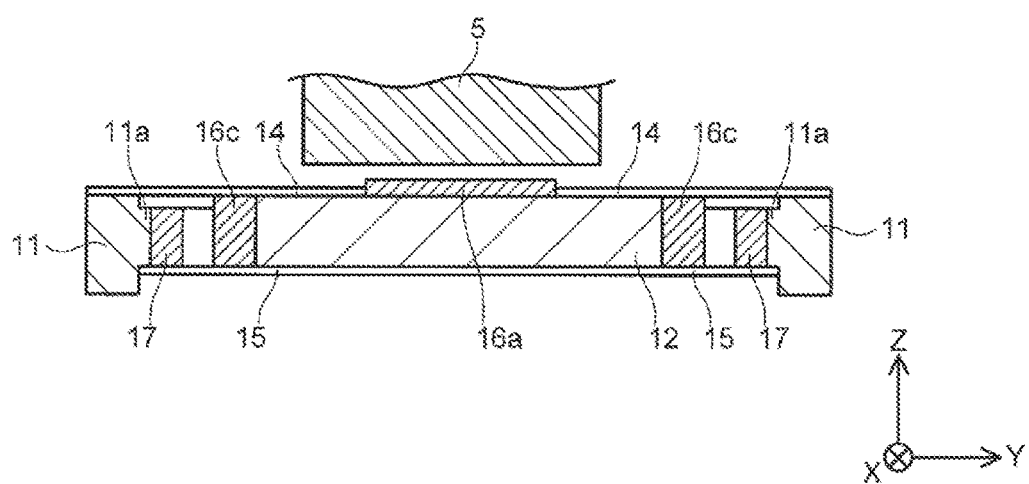

In the second modification, magnet part 17 separated from magnet part 5 is disposed at the four corners of base part 11 as shown in FIG. 4 for optical image stabilization in the θ direction. In the second modification, θ coil part 16c is preferably disposed in such a way that the coil surface thereof is raised and faces the surface of magnet part 17. It is also preferred that magnet part 17 protrudes inward from the inner wall surface of base part 11 with the use of protrusion 11a to be disposed in the vicinity of θ coil part 16c.

Figure 5:
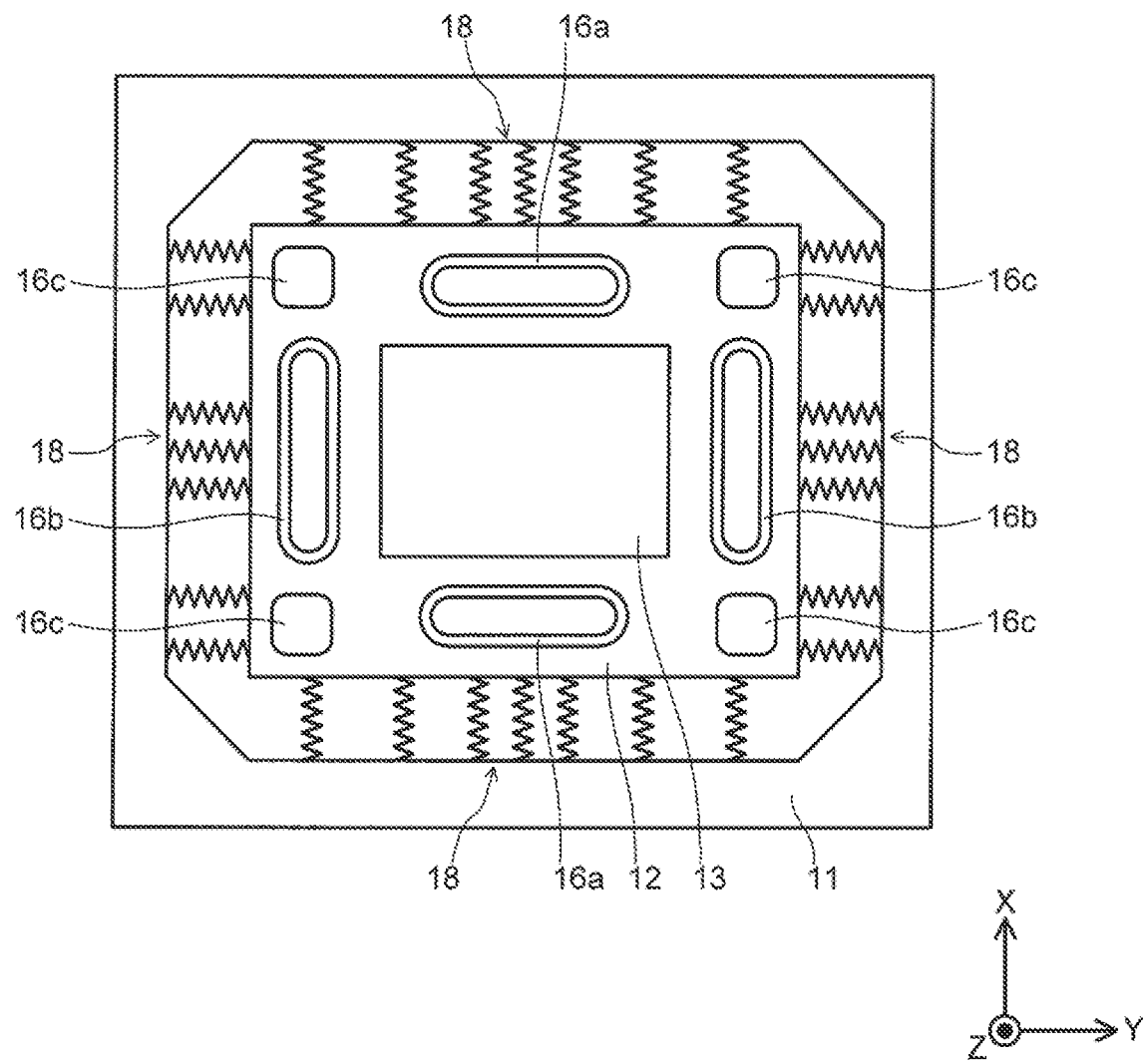
FIG. 5 is a plan view illustrating a third modification of the image sensor disposition part of the camera module.

In the third modification shown in FIG. 5, upper elastic arm 14 and lower elastic arm 15 of OIS elastic support members are replaced with compression coil springs 18. Seven compression coil springs 18 are disposed on each side in this modification. Number of compression coil springs 18 to be used is preferably set appropriately according to the required number of power supply systems and signal lines The use of compression coil springs 18 enables easy adjustment of the wire diameter and the turn setting.

In the third modification, three compression coil springs 18 near the central portion are disposed at a relatively narrow pitch on each side, and four compression coil springs 18 near the corners are disposed at a relatively wide pitch on each side. This configuration can individually set the spring constant for the central portion and the vicinity of the corner. In the illustrated third modification, for example, the spring constant of compression coil springs 18 in the central portion, which mainly control the driving in the X and Y directions, can be set at a high value, and the spring constant of compression coil springs 18 near the corners, which assist the driving in the X and Y directions, can be set at a low value. The method of adjusting the spring constant may be different from the method that changes the pitch.

Figure 6A:
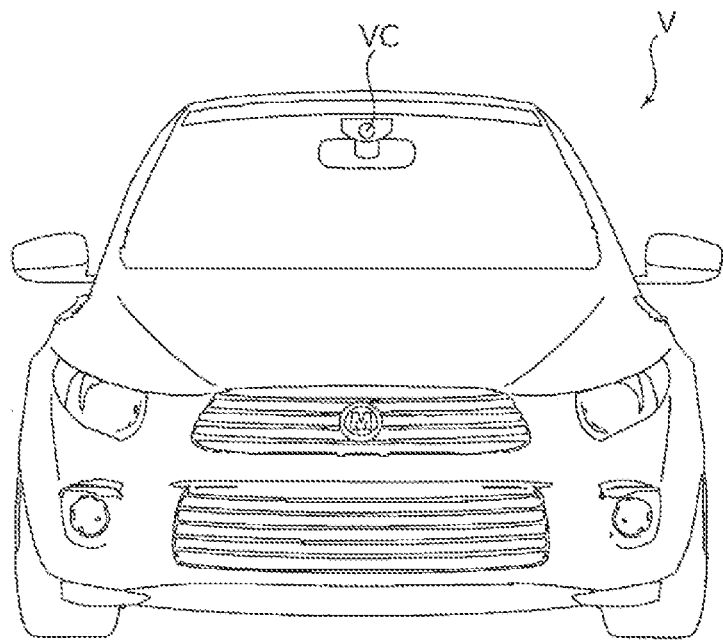
FIGS. 6A and 6B illustrate an automobile as a camera-mounted device equipped with an in-vehicle camera module, where
Figure 6B:
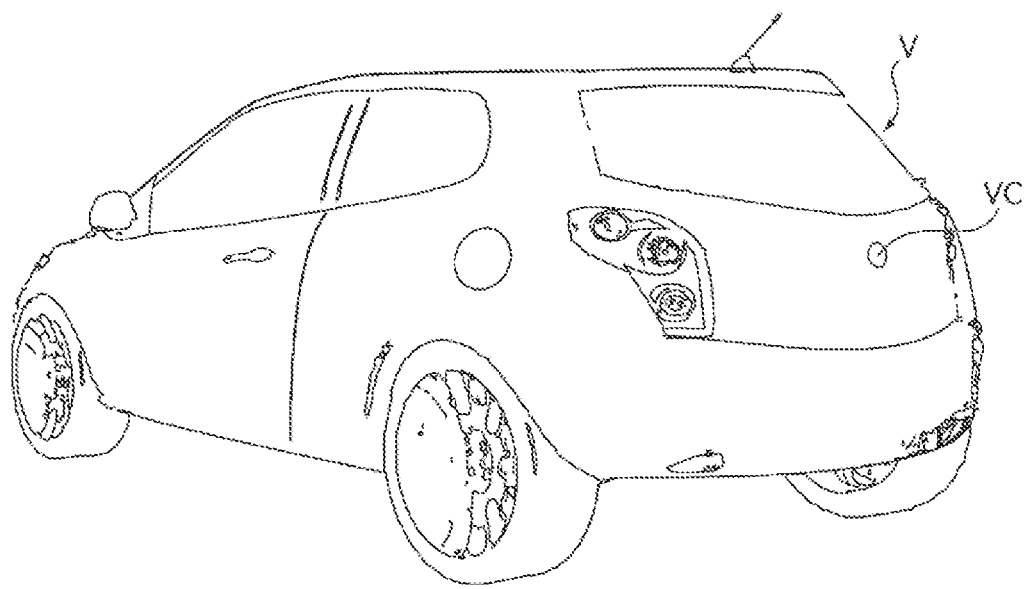

FIGS. 6A and 6B illustrate automobile V (camera-mounted device), an example of a transporting device equipped with in-vehicle camera module VC (i.e., vehicle camera). FIG. 6A is a front view of automobile V, and FIG. 6B is a rear perspective view of automobile V. Camera module A described in the embodiment is mounted in automobile V as in-vehicle camera module VC. As shown in FIGS. 6A and 6B, for example, in-vehicle camera module VC is attached to a windshield to face forward or is attached to a rear gate to face backward. In-vehicle camera module VC includes a not illustrated image processing part (for example, a CPU) which processes the image information obtained by image sensor 13. In-vehicle camera module VC is used for a back monitor, a drive recorder, collision avoidance control, automatic drive control, and the like.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefit of Japanese Patent Application No. 2018-155351 filed on Aug. 22, 2018, the disclosure of which including the specification, drawings and abstract is incorporated herein by reference in its entirety.

REFERENCE SIGNS LIST

1 Lens part
2 Cover (fixed part)
2a Opening
3 Lens holder
4 AF coil part
5, 17 Magnet part (driving part, driving magnet)
6 Magnet holder (fixed part)
7, 8 AF elastic support member
10 Image sensor disposition part
11 Base part (fixed part)
12 Image sensor board (image sensor holding part)
13 Image sensor
14, 15 OIS elastic support member (support part, elastic bridging part, upper part, lower part)
14a Bent part
14b X-direction extending part
14c Y-direction extending part
16a X coil part (driving part, driving coil)
16b Y coil part (driving part, driving coil)
16c θ coil part (driving part, driving coil)
18 Compression coil spring (support part, elastic bridging part)
A Camera module
O Optical axis
M Smartphone
V Automobile
OC Rear camera
VC In-vehicle camera module

The invention claimed is:
1. A camera module comprising:
a lens holder that holds a lens part;
an image sensor board that holds an image sensor, the image sensor board being disposed apart from the lens holder in a first direction along an optical axis of the lens part;
a driving part that includes a driving coil and a driving magnet that cooperate to move the image sensor holding part in a second direction and a third direction with respect to the lens holder and rotates the image sensor board in an around axis direction about the optical axis with respect to the lens holder, the second direction and the third direction each being orthogonal to the optical axis and being orthogonal to each other;
a fixed part that includes a lens holder housing part having an opening through which an optical axis passes and housing the lens holder in a state such that the lens holder is positioned so as not to be movable in the second direction or the third direction and not to be rotatable in the around axis direction; and
a support part that includes a plurality of elastic arms bridging the fixed part and the image sensor board and having an elasticity in a movable direction of the image sensor board and that supports the image sensor board so that the image sensor board is movable in the second direction and the third direction with respect to the fixed part and rotatable in the around axis direction with respect to the fixed part, wherein
each elastic arm is connected to the fixed part and the image sensor board at both ends of each elastic arm, and the plurality of elastic arms are bent in one circumferential direction in such a way that each elastic arm surrounds a periphery of the image sensor board between the both ends.

2. The camera module according to claim 1, wherein:
the support part supports the image sensor board so that the image sensor board is movable in the first direction with respect to the fixed part.

3. The camera module according to claim 1, wherein:
the plurality of elastic arms includes
an upper part including at least one of the plurality of elastic arms, the at least one elastic arm being disposed relatively on a front surface side of the image sensor board, and
a lower part including at least one of the plurality of elastic arms, the at least one elastic arm being disposed relatively on a back surface side of the image sensor board.

4. The camera module according to claim 1, wherein:
each elastic arm includes a second-direction extending part extending linearly in the second direction and a third-direction extending part extending linearly in the third direction with a bent part as a boundary.

5. A camera-mounted device that is an information device or a transporting device, the camera-mounted device comprising:
the camera module according to claim 1; and
circuitry configured to process image information obtained by the image sensor.

6. A camera module comprising:
a lens holder that holds a lens part;
an image sensor board that holds an image sensor, the image sensor board being disposed apart from the lens holder in a first direction along an optical axis of the lens part;
a driving part that includes a driving coil and a driving magnet that cooperate to move the image sensor holding part in a second direction and a third direction with respect to the lens holder and rotates the image sensor board in an around axis direction about the optical axis with respect to the lens holder, the second direction and the third direction each being orthogonal to the optical axis and being orthogonal to each other;

a fixed part that includes a lens holder housing part having an opening through which an optical axis passes and housing the lens holder in a state such that the lens holder is positioned so as not to be movable in the second direction or the third direction and not to be rotatable in the around axis direction; and a support part that includes a plurality of compression coil springs and that supports the image sensor board so that the image sensor board is movable in the second direction and the third direction with respect to the fixed part and rotatable in the around axis direction with respect to the fixed part, wherein each compression coil spring is connected to the fixed part and the image sensor board at both ends of each compression coil spring, and disposed so that a central axis of a coil of each compression coil spring is arranged along the second direction or the third direction between the both ends.

7. The camera module according to claim 6, wherein:
the support part supports the image sensor board so that the image sensor board is movable in the first direction with respect to the fixed part.

8. A camera-mounted device that is an information device or a transporting device, the camera-mounted device comprising:
the camera module according to claim 6; and
circuitry configured to process image information obtained by the image sensor.

9. A camera module comprising:
a lens holder that holds a lens part;
an image sensor board that holds an image sensor, the image sensor board being disposed apart from the lens holder in a first direction along an optical axis of the lens part;
a driving part that includes a driving coil and a driving magnet that cooperate to move the image sensor holding part in a second direction and a third direction with respect to the lens holder and rotates the image sensor board in an around axis direction about the optical axis with respect to the lens holder, the second direction and the third direction each being orthogonal to the optical axis and being orthogonal to each other; and
a fixed part that includes a lens holder housing part having an opening through which an optical axis passes and housing the lens holder in a state such that the lens holder is positioned so as not to be movable in the second direction or the third direction and not to be rotatable in the around axis direction, wherein
the driving magnet is disposed in the fixed part and the driving coil is disposed in the image sensor board, and the driving coil includes
a second-direction driving coil which moves the image sensor board in the second direction,
a third-direction driving coil which moves the image sensor board in the third direction, and
at least one around-axis-direction driving coil which rotates the image sensor board in the around axis direction.

10. The camera module according to claim 9, further comprising:
a support part that extends to connect with the fixed part and the image sensor board at both ends and that supports the image sensor board so that the image sensor board is movable in the second direction and the third direction with respect to the fixed part and rotatable in the around axis direction with respect to the fixed part.

11. The camera module according to claim 9 wherein:
the support part supports the image sensor board so that the image sensor board is movable in the first direction with respect to the fixed part.

12. The camera module according to claim 9, wherein:
the support part includes an elastic bridging part which bridges the fixed part and the image sensor board, the elastic bridging part having elasticity in a movable direction of the image sensor holding part.

13. The camera module according to claim 12, wherein:
the elastic bridging part includes a plurality of elastic arms, wherein
each elastic arm is connected to the fixed part and the image sensor board at both ends of each elastic arm, and the plurality of elastic arms are bent in one circumferential direction in such a way that each elastic arm surrounds a periphery of the image sensor board between the both ends.

14. The camera module according to claim 13, wherein:
the elastic bridging part includes
an upper part including at least one of the plurality of elastic arms, the at least one elastic arm being disposed relatively on a front surface side of the image sensor board, and
a lower part including at least one of the plurality of elastic arms, the at least one elastic arm being disposed relatively on a back surface side of the image sensor board.

15. The camera module according to claim 13, wherein:
each elastic arm includes a second-direction extending part extending linearly in the second direction and a third-direction extending part extending linearly in the third direction with a bent part as a boundary.

16. The camera module according to claim 9, wherein:
the image sensor board is in a rectangular shape, wherein
the at least one around-axis-direction driving coil includes two or more around-axis-direction driving coils which are disposed at diagonal positions of the image sensor board.

17. The camera module according to claim 9, wherein:
the driving magnet is used for both of rotating the image sensor board in the around axis direction and moving the image sensor board in the second direction or the third direction.

18. The camera module according to claim 9, wherein:
the driving magnet is used for both of rotating the image sensor board in the around axis direction and moving the image sensor board or the lens holder in the first direction.

19. The camera module according to claim 9, wherein:
the driving magnet is used for all of rotating the image sensor board in the around axis direction, moving the image sensor board in the second direction or the third direction, and moving the image sensor board or the lens holder in the first direction.

20. A camera-mounted device that is an information device or a transporting device, the camera-mounted device comprising:
the camera module according to claim 9; and
circuitry configured to process image information obtained by the image sensor.

* * * * *